United States Patent
Venzal (10) Patent No.: US 10,494,054 B2
(45) Date of Patent: Dec. 3, 2019

(54) DEVICE FOR MEASURING TORQUE APPLIED TO A ROTARY SHAFT AND ASSOCIATED TORQUE MEASUREMENT METHOD

(71) Applicants: CONTINENTAL AUTOMOTIVE FRANCE, Toulouse (FR); CONTINENTAL AUTOMOTIVE GmbH, Hannover (DE)

(72) Inventor: Simon-Didier Venzal, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/569,014

(22) PCT Filed: Apr. 26, 2016

(86) PCT No.: PCT/EP2016/000657
§ 371 (c)(1),
(2) Date: Oct. 24, 2017

(87) PCT Pub. No.: WO2016/173702
PCT Pub. Date: Nov. 3, 2016

(65) Prior Publication Data
US 2018/0127054 A1 May 10, 2018

(30) Foreign Application Priority Data
Apr. 30, 2015 (FR) ..................................... 15 53907

(51) Int. Cl.
*B62M 6/50* (2010.01)
*G01L 3/10* (2006.01)
*B62M 6/55* (2010.01)

(52) U.S. Cl.
CPC ................ *B62M 6/50* (2013.01); *B62M 6/55* (2013.01); *G01L 3/106* (2013.01)

(58) Field of Classification Search
CPC ............ B62M 6/50; B62M 6/55; G01L 3/106
See application file for complete search history.

(56) References Cited

U.S. PATENT DOCUMENTS 6,012,538 A * 1/2000 Sonobe .................... B62M 6/45
180/206.3
8,919,478 B2 * 12/2014 Gao ........................ B62M 6/55
180/206.4

(Continued)

FOREIGN PATENT DOCUMENTS

CN 101107516 A 1/2008
CN 102826186 A 12/2012

(Continued)

OTHER PUBLICATIONS

International Search Report dated Jul. 18, 2016, with corresponding PCT application.

*Primary Examiner* — Tony H Winner
*Assistant Examiner* — Michael R Stabley
(74) *Attorney, Agent, or Firm* — Young & Thompson (57) ABSTRACT

Disclosed is a device for measuring torque applied to a rotary shaft, including: a transmission, including a first part securely fastened to the shaft and receiving the torque applied to the shaft, and a second part securely fastened to the first part and able to move in relation to the first part when a torque is applied thereto; a first electrode securely fastened to the second part; a first support, securely fastened to the second part, including a second electrode situated facing the first electrode when no torque is applied to the shaft, the first and the second electrodes generating a first capacitance, the value of which varies according to a movement of the second part; a unit for measuring the first (Continued)

capacitance; and a unit for converting the first capacitance into a value of the torque applied to the shaft.

20 Claims, 4 Drawing Sheets (56) References Cited

U.S. PATENT DOCUMENTS

| | | |
|---|---|---|
| 2007/0113669 A1 | 5/2007 | Bernstein et al. |
| 2010/0093494 A1* | 4/2010 | Smith .................... B62M 6/50 482/8 |
| 2013/0197740 A1 | 8/2013 | Hagel et al. |

FOREIGN PATENT DOCUMENTS

| | | |
|---|---|---|
| CN | 103278274 A | 9/2013 |
| CN | 103354879 A | 10/2013 |
| CN | 103460002 A | 12/2013 |
| CN | 103560632 A | 2/2014 |
| DE | 100 06 534 A1 | 10/2001 |
| DE | 10 2011 006644 A1 | 10/2012 |
| EP | 1 026 492 A2 | 8/2000 |
| FR | 2 975 461 A1 | 11/2012 |
| JP | 2008-107297 A | 5/2008 |
| WO | 2012/130550 A1 | 10/2012 |

* cited by examiner

DEVICE FOR MEASURING TORQUE APPLIED TO A ROTARY SHAFT AND ASSOCIATED TORQUE MEASUREMENT METHOD

The invention relates to a device for measuring torque applied to a rotary shaft, and more particularly to the shaft of a crankset fitted on an electric bicycle, and to an associated torque measurement method. The present invention finds a particularly advantageous although in no way limiting application in torque determination devices on-board cycles.

Various devices currently exist that make it possible to determine the torque applied to a component that is able to move in rotation. Said component is generally integrated within a mechanical system including a plurality of elements that are intended to transmit mechanical energy from the input to the output of said mechanical system.

Such devices are used, for example, to measure the torque applied to a transmission shaft, positioned at the engine output, within a passenger transport vehicle. In the conventional case of a motor vehicle, these devices make it possible, for example, to check that the engine transfers its power to other elements of said vehicle, such as for example the wheels, the alternator, etc., in accordance with a prescribed performance target.

The present invention, for its part, makes reference to a cycle transport vehicle, such as for example a bicycle, in which a user exerts a force on pedals that are linked to a crankset axle that is set in rotation by said force.

Besides the fact that they are able to ensure a correct transfer of power throughout a mechanical system, the existence of such devices is also in particular warranted by the requirement to check that the magnitude of the torque applied does not exceed a certain value, beyond which said torque may bring about a twisting effect on the axle. For example, in the case of twisting of the crankset axle of a bicycle with electric assistance, the aim of this kind of check is to make it possible to trigger an electric motor that contributes to the effort that is required to move the bicycle, and that thus contributes to the comfort of the user.

Such an on-board device conventionally comprises, besides a specific support enabling it to be installed in said transport means:
   an axle driven in rotation by said torque,
   sensitive elements that are designed to provide a signal representative of a strain to which said at least one sensitive element is subjected under the effect of said torque,
   means for conveying said signal to a processing module that is configured to determine said torque depending on said signal.

At the present time, there are several types of device in existence that make it possible to determine the torque applied to a rotating axle. These generally involve detecting mechanical deformations of the axle, for example expansions or contractions, or else certain quantities linked with these deformations, which are caused by said torque, by means of strain gages.

The sensitive elements, such as said strain gages, are generally in direct contact with the rotating axle, and therefore operate under torsion. As a result, the latter are subjected to significant strain, ultimately making the implementation and use of the device not very robust.

A configuration of this kind is also applied to said conveying means, for which it is then necessary to take into account, in particular, phenomena of wear and periodical maintenance. More recent systems, such as rotary transformers with differential coupling, combine sensitive elements and conveying means, both of which are contactless, but still remain reliant on a complex electronic support, and are therefore difficult to install on board an electric bicycle.

The aim of the present invention is to mitigate all or some of the drawbacks of the prior art, in particular those outlined above, by proposing a solution that makes it possible to have a device for determining torque applied to a rotating axle of a vehicle, and having sensitive elements, not in contact with said rotating axle, which device is designed to provide a signal that is able to be measured by a processing module that is itself not in contact with said rotating axle.

The invention proposes a device for measuring torque applied to a rotary shaft, comprising:
   torque transmission means, including a first part securely fastened to the shaft and receiving the torque applied to said shaft, and a second part securely fastened to the first part and able to move in relation to the first part when a torque is applied to the first part,
   at least one first electrode securely fastened to the second part,
   a first support, securely fastened to the second part, comprising at least one second electrode situated facing the first electrode when no torque is applied to the shaft, the first and the second electrodes generating a first capacitance, the value of which varies according to a movement of the second part,
   means for measuring the first capacitance,
   means for converting the first capacitance into a value of the torque applied to the shaft.

The means for measuring the first capacitance preferably comprise:
   a resonant coil connected to the second electrode, forming, with the second electrode, a passive resonant circuit having a resonant frequency dependent on the first capacitance,
   a second support, situated facing the first support and remote from said first support, comprising an exciter coil able to generate an electromagnetic field intended for the resonant coil and able to receive an induced magnetic field originating from the resonant coil,
   means for emitting an electromagnetic field,
   means for receiving an electromagnetic field, the resonant frequency of which depends on the torque applied to the shaft,
   switching means that are linked electrically on one side to the exciter coil and on the other side either to the emission means or to the reception means.

And the conversion means comprise a microcontroller linked electrically on one side to the reception means and to the emission means.

In one preferred embodiment of the measuring device according to the invention, the transmission means having a shape of a cylinder surrounding the rotary shaft, the second part is a part of the cylinder contained between two grooves in a longitudinal axis of the cylinder. Said second part starts from a transverse face of the cylinder, termed free end, and extends as far as a linked end (linked to the cylinder), situated opposite said free end.

Advantageously, the two grooves each terminate at their linked end with a recess of rounded shape.

The grooves may have a length of between 30% and 70% of a length of the transmission means.

The first support cleverly comprises a printed circuit board with two faces:
   the first face comprises the first electrode, the second face comprises the resonant coil that is linked electrically on one side to the first electrode by a via and linked electrically on the other side to ground.

In one embodiment of the measuring device, the transmission means being a cylinder having an outer diameter and an inner diameter:
- the first electrode is situated on a transverse face of the cylinder,
- the first support has the shape of a flat ring, with an outer diameter equal to the outer diameter of the cylinder and with an inner diameter equal to the inner diameter of the cylinder.

The invention also relates to a method for measuring a torque applied to a rotary shaft, characterized in that it comprises:
- Step 1: mounting, on the rotary shaft, torque transmission means, including a first part securely fastened to the shaft and receiving the torque applied to said shaft, and a second part securely fastened to the first part and able to move in relation to the first part when a torque is applied to the first part,
- Step 2: attaching a first electrode securely to the first part,
- Step 3: mounting a first support, securely fastened to the second part, comprising at least one second electrode situated facing the first electrode when no torque is applied to the shaft, the first and the second electrodes generating a first capacitance, the value of which varies according to a movement of the second part,
- Step 4: measuring the first capacitance, when a torque is applied to the shaft, using measuring means,
- Step 5: calculating the torque applied to the shaft depending on the first capacitance, using conversion means.

The invention is applicable to any electric bicycle comprising a measuring device according to any one of the features listed previously.

The features and advantages of the invention well be better appreciated by virtue of the following description, which description discloses the features of the invention through preferred embodiments that in no way limit the invention.

Figure 1A:
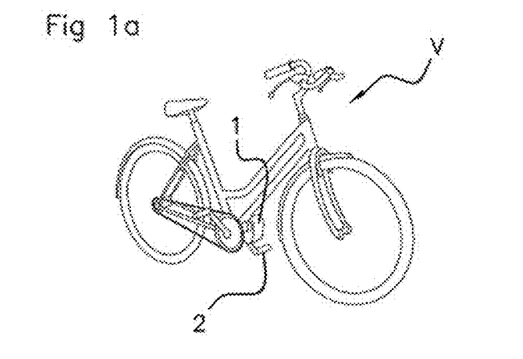
FIG. 1a shows a schematic representation of an electric bicycle.

The description makes reference to the appended figures, in which:

FIG. 1a shows an electric bicycle V provided with a crankcase 1 for a pedaling assistance system, fastened about a rotary shaft, in this case fastened about the crankset axle 2a.

Said crankcase 1 comprises:
- the crankset axle 2a, including, at each of its two ends, a crank arm and a pedal 2,
- transmission means 2b', of cylindrical shape, securely fastened to the rotary shaft that forms the crankset axle 2a, for example surrounding said axle; the crankset axle 2a is preferably embedded in the transmission means 2b', or else the crankset axle 2a and the transmission means 2b' are welded locally, said transmission means 2b' and the crankset axle 2a being concentric. Said transmission means 2b', on one side, drive a plate 2c, on which is situated a transmission chain or belt 4,
- an electric assistance motor 3 driving the crankset axle 2a by means of an assistance transmission sprocket 3a and of an assistance transmission crown gear 2d,
- an electronic assistance control board 5, controlling the electric assistance motor 3 via a signal S.

The operation of an electric bicycle V is known from the prior art. As explained previously, in the prior art, the electric bicycle V comprises a torque sensor that measures the magnitude of the torque C on the crankset axle 2a, resulting from the cyclist pressing on the pedals 2. This torque sensor is linked to a management unit contained on the electronic assistance control board 5 that controls the operation of the electric assistance motor 3. When the torque C applied to the crankset axle 2a by the cyclist exceeds a predetermined value, the management unit that receives the information about the value of the applied torque controls the operation of the electric motor 3, which then drives the crankset axle 2a, thus relieving the cyclist in terms of his effort. Now, the torque sensors of the prior art have several drawbacks that were presented previously.

Figure 1B:
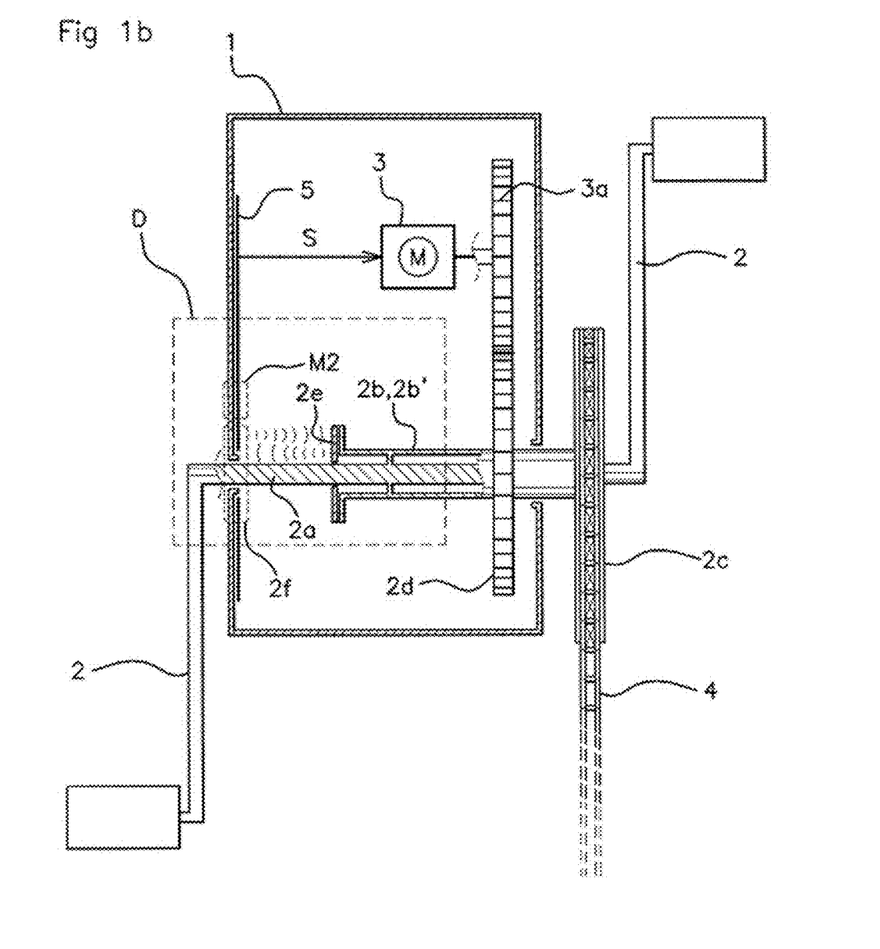
FIG. 1b shows a schematic representation of the device for measuring torque, according to the invention, integrated into the crankset.
Figure 2:
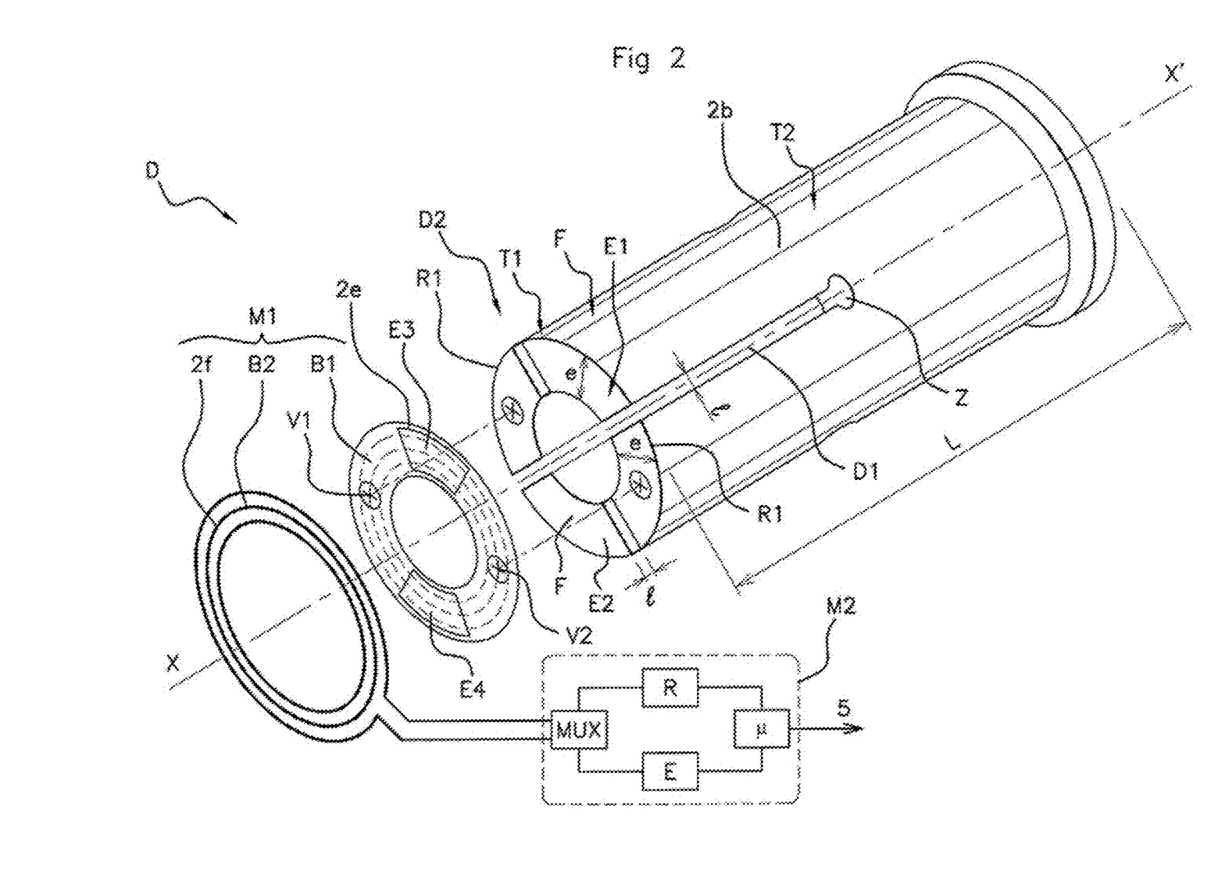
FIG. 2 shows a schematic representation of an exemplary implementation of a device for measuring the torque applied to the crankset axle, according to the invention.

The invention proposes that the electric bicycle V be equipped with a device D for measuring torque, which device is contained in the pedaling assistance system crankcase 1 and is as illustrated in FIGS. 1b and 2.

Said device D for measuring torque comprises:
- torque C transmission means 2b, including a first part R1 securely fastened to the shaft, that is to say to the crankset axle 2a, and receiving the torque C applied to said shaft, and a second part F securely fastened to the first part R1 and able to move in relation to the first part R1 when a torque C is applied to the first part R1,
- at least one first electrode E1 securely fastened to the second part F,
- a first support 2e, securely fastened to the first part R1, comprising at least one second electrode E3 situated facing the first electrode E1 when no torque C is applied to the shaft, the first and the second electrode E1, E3 generating a first capacitance C1, the value of which varies according to a movement Δd of the second part F,
- means M1 for measuring the first capacitance C1,
- means M2 for converting the first capacitance C1 into a value of the torque C applied to the rotary shaft, that is to say applied to the crankset axle 2a.

The transmission means 2b, securely fastened to the crankset axle 2a, drive, as in the prior art, on a first side, a plate 2c, on which is located a chain or a belt 4 linked to the rear wheel of the electric bicycle V.

According to the invention, the device D for measuring torque is situated on the side opposite the first side (cf. FIG. 1b).

The transmission means 2b are made of metal, such as an aluminum-based alloy, having a modulus of elasticity lower than that of a steel.

The first part R1 of the transmission means 2b is securely fastened directly to the crankset axle 2a; for example, the first part R1 is welded to the crankset axle 2a and directly receives the torque C applied to the crankset axle 2a.

Figure 3:
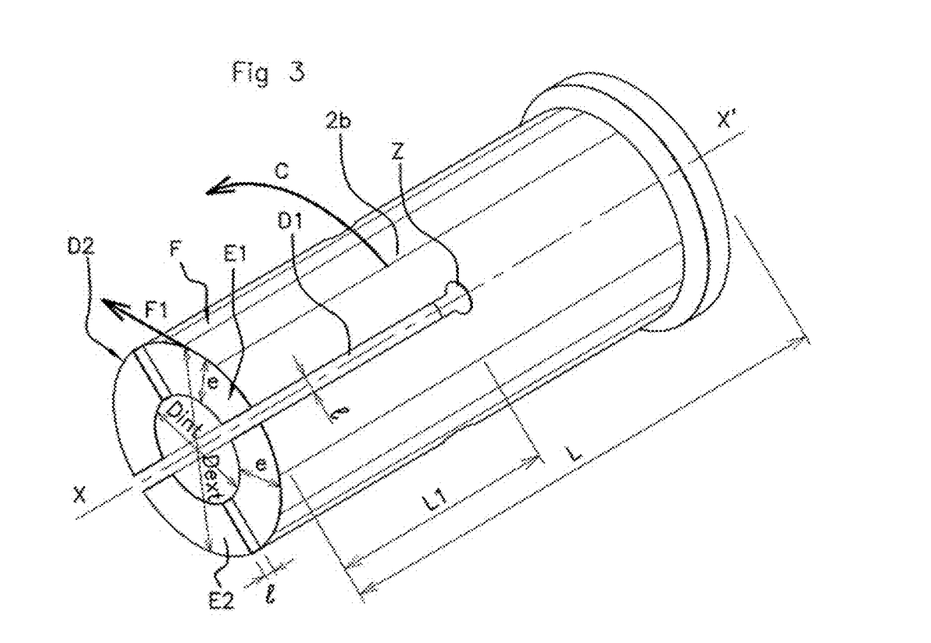
FIG. 3 is a schematic representation of the transmission means of the device for measuring torque according to the invention.

The second part F is a part of the transmission means 2b, which is securely fastened to the first part R1. Said second part F may be a part that is cut out of the transmission means 2b, as illustrated in FIGS. 2 and 3. Cut-out part is understood to mean a part that comprises two longitudinal grooves D1, D2, that is to say that are oriented along a longitudinal axis X-X' of the transmission means 2b. The transmission means 2b take the form of a cylinder of thickness e, of length L, and having an outer diameter $D_{ext}$ and an inner diameter $D_{int}$, the grooves D1, D2 are formed throughout the entire thickness e of the cylinder. Said thickness e may be equal to a few millimeters, for example between 4 and 6 mm. These longitudinal grooves D1, D2 extend over a length L1 starting from a transverse face of the transmission means 2b, situated on the side where the device for measuring torque C is located, that is to say on the side opposite the first side. The transverse face is perpendicular to the longitudinal axis X-X' of the transmission means 2b.

The grooves D1, D2 extend over a portion (L1) of the length L of the transmission means 2b. The length L1 of said grooves D1, D2 is between 30% and 70% of the length L of said transmission means, and is equal, for example, to 50% of the length L of said transmission means 2b.

Each of these two grooves D1, D2 has a width I of between 1 and 5 mm, for example. The width I is defined depending on the movement Δd of the second part F that it is desired to measure (this is explained below).

The second part F is located between the two grooves D1, D2 and is spaced apart on each side from the first part R1 of the transmission means 2b by said grooves D1, D2.

This second part F has a first free end T1 on the side of the transverse face of the transmission means 2b, and a second end T2 linked to the first part R1 (cf. FIG. 2). 'Free' end is understood to mean an end that is not linked to the first part R1. 'Linked' end is understood to mean an end where the second part F is securely fastened to the first part R1 and to the transmission means 2b.

In one preferred embodiment of the measuring device according to the invention, on the side of the second end T2, the first and second groove D1, D2 terminate while forming recesses Z, for example of rounded shape, that are wider than the grooves D1, D2.

In the example illustrated in FIGS. 2 and 3, the transmission means 2b comprise two second parts F that are preferably diametrically opposed. Between the two second parts F are located two first parts R1 that are also preferably diametrically opposed. Said two first parts R1 are securely fastened directly to the crankset axle 2a, for example welded to said axle, and receive the torque C applied to the axle. The second parts F are not securely fastened to the crankset axle 2a, they may each move in relation to the two first parts R1.

For the sake of clarity, the invention will be detailed here taking into consideration a single second part F and a single first part R1.

According to the invention, the second part F, on the transverse face of the transmission means 2b, that is to say on the side of the first free end T1, comprises a sensitive element 2f (cf. FIG. 2), of the capacitive surface type, for example a first electrode E1. An electrode is understood to mean a conductive metal plate, for example made of copper.

The first support 2e is attached to the first part R1 of the transverse face of the transmission means 2b. Said first support 2e has the shape of a flat ring having the same inner and outer diameters $D_{int}$ and $D_{ext}$ as the transmission means 2b. The first support 2e is held on the first part R1 by two screws V1, V2 that are situated on the circumference of the first support 2e, securely fastening the first support 2e to the transmission means 2b on the first part R1.

With the second part F not being securely fastened to the emitter support 2a, it is therefore able to move in relation to the first part R1 and therefore also in relation to the first support 2e.

Figure 4:
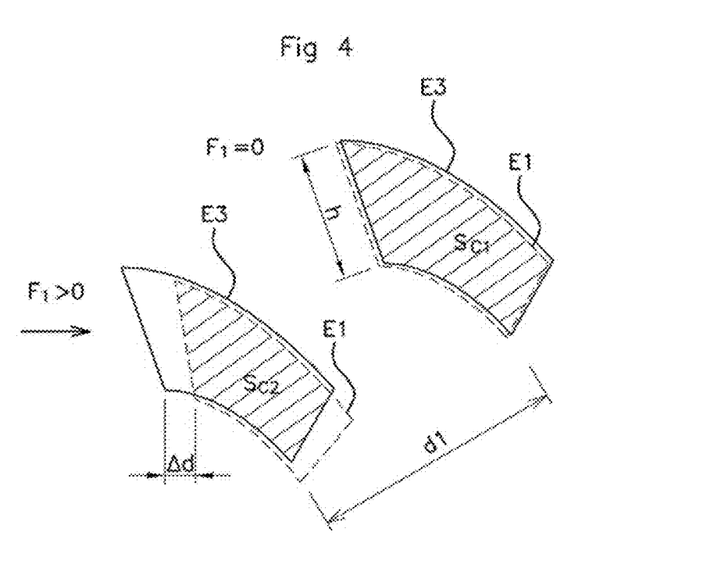
FIG. 4 is a schematic representation of the movement of the first electrode in relation to the second electrode when a torque is applied to the transmission means.

The first support 2e comprises a second electrode E3, which, when no torque C is applied to the crankset axle 2a, is situated facing the first electrode E1. This is illustrated in FIG. 4.

The first and the second electrode E1 and E3 are preferably made of copper, for example, have a rectangular shape, or are in the shape of an arc of a circle or of a portion of a ring (with an aperture angle of between 5° and 20°, for example) and have identical dimensions. If we define $S_1$ as the metal surface area of the first electrode E1 (which is equal to the metal surface area of the second electrode E3), and $S_{C1}$ as being the metal surface area common between the two electrodes E1, E3, that is to say the portion of metal surface area common between the first electrode E1 and the second electrode E3 when the first electrode E1 is projected onto the second electrode E3 in a direction perpendicular to the plane of the first electrode E1, then when no torque C is applied to the second part F, we have $S_1=S_{C1}$.

The electrode pair defined by the first and second electrodes E1, E3 that are situated facing one another creates, between the terminals of the second electrode E3, a first capacitance C1, defined by:

$$C1 = \frac{\varepsilon \times S_{c1}}{d1}$$

Where:
$S_{C1}$ is the metal surface area common to the two electrodes E1, E3,
d1 is the distance between the two electrodes E1, E3,
ε is the dielectric constant of air.

The value of said first capacitance C1 is measured with the aid of measuring means M1.

These measuring means M1 comprise a resonant coil B1, of inductance L1, that is connected to the second electrode E3, thus forming a passive resonant electric 'inductor-capacitor' circuit, also termed 'LC circuit'. 'Passive' circuit is understood to mean an electronic circuit that is not supplied with a voltage.

The LC passive resonant circuit has a natural resonant frequency $f_R$ that is dependent on the value of the inductance L1 of said resonant coil B1, which value is a set value, and on the first capacitance C1 of said resonant circuit.

Thus:

$$f_R = \frac{1}{2 \times \pi \times \sqrt{L1 \times C1}}$$

Where
Π is a constant equal to 3.14
L1 is the inductance of the resonant coil B1,
C1 is the first capacitance.

Figure 5:
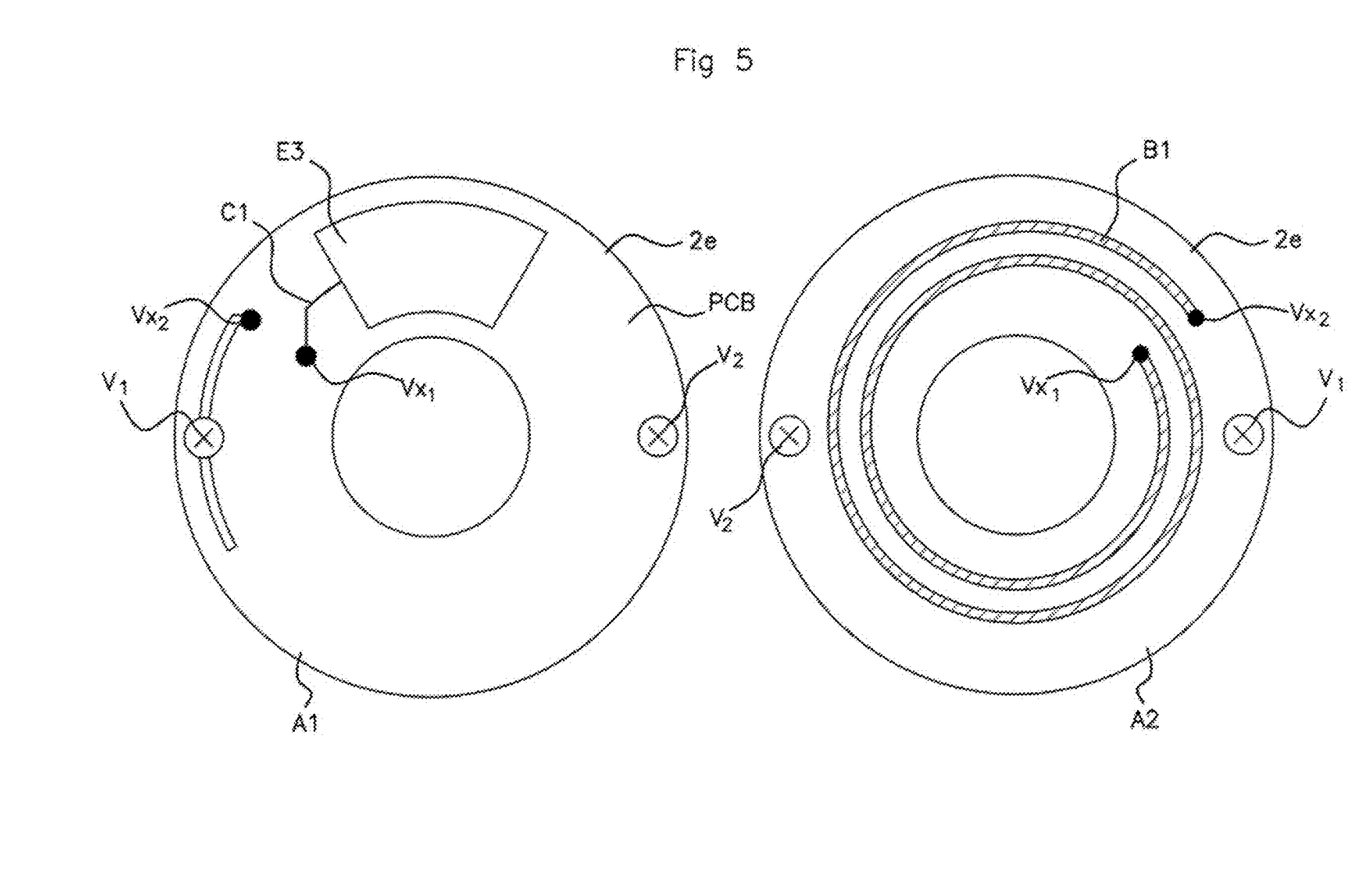
FIG. 5 is a schematic representation of the first support of the device for measuring torque according to the invention.

The resonant coil B1 is preferably circular and has a number N of turns of copper wire, which are wound in a circular fashion on the periphery of the first support 2e (cf. FIG. 5).

As illustrated in FIG. 5, the first support 2e is formed of a 'dual-face' electronic printed circuit board, that is to say a circuit board printed on both faces A1, A2 of the first support 2e.

The second electrode E3 made of copper is located on a first face A1.

The resonant coil B1 is located on a second face A2 and is connected on one side to the second electrode E3 by a via $V_{X1}$ passing through the first and second face A1, A2 and connected on the other side to ground by a via $V_{X2}$, which is itself linked to a fastening screw V1.

The measuring means M1 also comprise a second support $2f$ that is remote and separate from the first support $2e$. The second support $2f$ is situated facing the first support $2e$, preferably the first and the second support $2e$, $2f$ are in planes that are parallel with one another. The second support $2f$ is, for example, contained on the electronic assistance control board 5, which board is situated at the end of the crankset axle $2a$.

The second support $2f$ comprises an exciter coil B2.

Preferably, the exciter coil B2 is circular, has the same dimensions as the resonant coil B1, and has the same number N of turns of copper wire. The exciter coil B2 is able to generate an electromagnetic field in the direction of the resonant coil B1, and is able to receive, in return, an induced electromagnetic field originating from the resonant coil B1.

The means M1 for measuring the first capacitance C1 furthermore comprise means E for emitting an electromagnetic field B1 and means R for receiving an electromagnetic field, and switching means in the form of a multiplexer MUX linked on one side to the exciter coil B2 and on the other side either to the emission means E or to the reception means R mounted in parallel with the latter.

The emission means E comprise an emission circuit E. The reception means R comprise a reception circuit R.

The means M2 for converting the first capacitance C1 into a value of a torque C applied to the shaft comprise a microcontroller p linked electrically on one side to the emitter and receiver circuits E and R and on the other side to the electronic assistance control board 5.

The multiplexer MUX operates like a switch; it is linked electrically to the emitter circuit E in a first position, and it is linked electrically to the receiver circuit R in a second position. The microcontroller p controls the operation of the multiplexer MUX and its switching frequency between the first and the second position.

The emitter circuit E consists, for example, of a voltage-to-current amplifier incorporating a filter, which receives a clock signal originating from the microcontroller p. Said clock signal has a variable frequency that is able to be controlled by the microcontroller μ. The clock signal is amplified, and filtered by the amplifier and the filter of the emitter circuit E, and is converted into a current. Said current is supplied to the exciter coil B2, inducing the creation of an excitation magnetic field in the direction of the resonant coil B1. The microcontroller p incorporates a frequency scanning function, making it possible to vary the frequency of the clock signal sent to the emitter circuit E. Said frequency of the clock signal controls the frequency of the excitation current sent to the exciter coil B2 and therefore the frequency of the excitation magnetic field.

The reception circuit R comprises, for example, a voltage amplifier that receives, as input, a voltage representative of the magnetomotive force originating from the exciter coil B2. When the multiplexer MUX is linked electrically to the receiver circuit R, the exciter coil B2 behaves like an electromagnetic field reception coil. The exciter coil B2 then receives the induced electromagnetic field that is sent by the resonant coil B1, in response to the electromagnetic field that was sent beforehand by the exciter coil B2. The receiver circuit R then receives a voltage that is an image of the electromagnetic field received by the exciter coil B2. Said voltage is then amplified by the receiver circuit R then transmitted to the microcontroller μ, which deduces the resonant frequency $f_R$ of the LC circuit therefrom.

To this end, a digital function integrated into the microcontroller μ analyzes the received voltage signal in order to find the frequency at which the voltage amplitude is the greatest. This frequency corresponds to the resonant frequency $f_R$ of the resonant coil B1.

The multiplexer MUX, the microcontroller μ, the emitter circuit E and the receiver circuit R may be integrated into the electronic assistance control board 5, which makes it possible to control the electric assistance motor 3. The microcontroller μ is linked to the management unit of the electronic assistance control board 5. The electronic assistance control board 5 includes functions, known to those skilled in the art, making it possible to trigger and manage the supply of power to the electric assistance motor 3 in accordance with predetermined conditions. The aim of said functions is to ensure that the electric assistance motor 3 supplies an assistance torque if, and only if, the cyclist is pedaling, that is to say is applying a torque to the pedals 2, this constituting the operation of an electric bicycle V.

The operation of the device D for measuring torque is described below:

When a torque C is applied to the crankset axle $2a$ by the cyclist, said torque C is transmitted directly to the transmission means $2b$, which are securely fastened to the crankset axle $2a$.

The torque C is received directly by the first part R1.

The torque C thus applied creates a force F1 at the periphery of the second part F, which causes a lateral movement Δd (indicated by the arrow d in FIG. 3) of the second part F in relation to the first part R1, the force F1 being defined by:

$$F1 = \frac{C}{D_{ext}} \times 2$$

Where

F1 is the force applied to the periphery of the second part F,

C is the torque applied to the transmission means $2b$, $D_{ext}$ is the outer diameter of the transmission means $2b$.

The second part F then behaves mechanically like a beam that moves with the force F1. The second part F undergoes a relative lateral movement Δd in relation to the first part R1 and also in relation to the first support $2e$.

Specifically, the lateral movement Δd is dependent on the force F1 that is applied to the second part F, giving us:

$$\Delta d = f_1(F1) = k_f \times F1$$

Where $k_f$ is a constant dependent on the dimensions of the second part F and on the material of the second part F.

The first support $2e$ being securely fastened to the first part R1, the first electrode E1 consequently undergoes the same lateral movement Δd in relation to the second electrode E3.

As illustrated in FIG. 4, when the first electrode E1 moves in relation to the second electrode E3, that is to say when F1>0, the first and second electrode E1, E3 are not facing one another completely, the new surface area $S_{C2}$ common between the first and the second electrode E1, E3 is reduced in relation to the common surface area $S_{C1}$ with the first and second electrode E1, E3 facing one another when no force F1=0 is applied to the second part F.

Specifically, the new surface area $S_{C2}$ common between the first and second electrode E1, E3 is also dependent on the force F1 applied to the second part F.

$$S_{c2} = f_2(F1)$$

When F1>0, $S_{c2}$<$S_{c1}$, reducing the metal surface area common between the two electrodes E1, E3 (that is to say ($S_{c1}$−$S_{c2}$)) causes a variation in the value of the first capacitance C1.

When F1>0, the new first capacitance C1' between the terminals of the second electrode E3 is lower than the first capacitance C1, measured when F1=0.

The invention lies in the fact that this new first capacitance C1' is proportional to the lateral movement Δd of the first electrode E1, and therefore to the force F1 applied to the second part F, and consequently also proportional to the torque C applied to the crankset axle 2a.

By measuring the value of said new first capacitance C1', the device for measuring torque according to the invention makes it possible to obtain the value of the torque C applied to the crankset axle 2a. This is explained below.

This new first capacitance C1' modifies the value of the resonant frequency $f_{R'}$ of the LC circuit of the first emitter 2, the LC circuit then operating with a new resonant frequency $f_{R'}$.

The measuring means M1 measure the first capacitance C1, and therefore the value of the new first capacitance C1' by means of the new resonant frequency $f_{R'}$ of the LC circuit.

Next, the measuring means M1 transmit the new resonant frequency $f_{R'}$ to the conversion means, which deduce therefrom the torque C applied to the crankset axle 2a, as explained below.

In a first instance, the multiplexer MUX is in the first position, and the exciter coil B2 generates, with the aid of the emitter circuit E linked to the microcontroller μ, an electromagnetic field, which is received by the resonant coil B1.

The resonant coil B1 generates, in return, in the direction of the exciter coil B2, an induced electromagnetic field at the new resonant frequency $f_{R'}$.

In a second instance, the multiplexer MUX is in the second position, and the electromagnetic field received by the exciter coil B2 originating from the resonant coil B1 modifies the voltage across the terminals of said exciter coil B2, said voltage is received by the receiver circuit R then measured by the microcontroller μ.

The microcontroller μ deduces, from this voltage, the new resonant frequency $f_{R'}$: the inductance L1 of the resonant coil B1 being known, the new first capacitance C1' is able to be calculated by the microcontroller μ.

Specifically, we have:

$$C1' = \frac{1}{(f_{R'} \times 2 \times \pi)^2 \times L1}$$

Where
C1' is the new first capacitance when F1>0,
$f_{R'}$ is the new resonant frequency when F1>0,
L1 is the inductance of the resonant coil B1.

Next, the new common surface area $S_{C2}$ is calculated by the microcontroller μ:

$$S_{c2} = \frac{d1 \times C1'}{\varepsilon}$$

Where:
$S_{C2}$ is the new surface area common to the electrodes E1, E3 when F1>0,
d1 is the distance between the two electrodes E1, E3,
C1' is the new first capacitance when F1>0,
ε is the dielectric constant of air.

In a scenario where the first and the second electrodes E1, E3 have a rectangular shape, if we consider h to be the width of the first and second electrodes E1, E3, the movement Δd of the first electrode E1 in relation to the second electrode E3, that is to say the movement Δd of the sensitive element F, is equal to:

$$\Delta d = \frac{(S_{c2} - S_{C1})}{h}$$

Where
$S_{C1}$ is the surface area common to the two electrodes E1, E3 when F1=0
$S_{C2}$ is the surface area common to the two electrodes E1, E3 when F1>0.

The lateral movement Δd depends on the force F1 applied:

$$\Delta d = k_F \times F1$$

Where:
$k_F$ is a constant dependent on the dimensions and on the material of the second part F.

According to beam theory, considering the force F1 distributed uniformly at the periphery of the second part F over the length L1, the constant $k_F$ may be calculated in the following manner:

$$k_F = \frac{L1^3}{8 \times E \times I}$$

Where:
L1 is the length of the grooves D1, D2,
E is the modulus of elasticity of the material of the second part F,
I is the section modulus of the second part F.

We then deduce therefrom the force F1, specifically:

$$F1 = \frac{\Delta d \times 8 \times E \times I}{L1^3}$$

The force F1 being known, the torque C applied to the transmission means may be deduced by:

$$C = \frac{F1 \times D_{ext}}{2}$$

Where:
C is the torque applied to the transmission means 2b,
F1 is the force applied to the periphery of the second part F,
$D_{ext}$ is the outer diameter of the transmission means 2b.

The microcontroller μ sends the value of the torque C that it has thus calculated to the management unit contained on the electronic assistance control board 5 in order to trigger the activation of the assistance electric motor 3, if the value of said torque C exceeds a predetermined threshold.

The invention also relates to a torque measurement method, using the device D for measuring torque described above.

The torque measurement method, according to the invention, comprises the following steps:

Step 1: mounting, on the rotary shaft, torque transmission means 2b, including a first part R1 securely fastened to the shaft and receiving the torque C applied to said shaft 2a, and a second part F securely fastened to the first part R1 and able to move in relation to the first part R1 when a torque C is applied to the first part R1, Step 2: attaching a first electrode securely to the first part F, Step 3: mounting a first support 2e, securely fastened to the second part R1, comprising at least one second electrode E3 situated facing the first electrode E1 when no torque C is applied to the shaft 2a, the first and the second electrodes E1, E3 generating a first capacitance C1, the value of which varies according to a movement Δd of the second part F, Step 4: measuring the first capacitance C1', when a torque C is applied to the shaft, using the measuring means M1, Step 5: calculating the value of the torque C applied to the shaft 2a depending on the first capacitance C1, using the conversion means M2.

The device for measuring torque according to the invention therefore makes it possible to measure the torque applied to a rotary shaft in a simple, reliable and robust manner. The advantage of the invention lies in the use of a capacitive sensor, of a resonant coil, and of an exciter coil, and of electronic components (receiver and emitter circuits, multiplexer) that are inexpensive in comparison with the torque sensors of the prior art in order to determine, without a wired link to the rotary shaft, the torque that is applied to said shaft.

To this end, the invention cleverly uses the capacitance, measured with the aid of a resonant frequency.

Of course, the invention is not limited to the means for measuring the first capacitance C1, described previously, that is to say using the resonant frequency of the 'LC' circuit, when the capacitance C1 is linked electrically to a resonant coil, but is applicable to any means for measuring the first capacitance C1, the latter being representative of the torque C applied to the crankset axle 2a.

The invention claimed is:

1. A device (D) for measuring torque applied to a rotary shaft (2a), comprising:
   torque transmission means (2b), including a first part (R1) securely fastened to the shaft and receiving the torque (C) applied to said shaft (2a), and a second part (F) securely fastened to the first part (R1) and able to move in relation to the first part (R1) when a torque (C) is applied to the first part (R1),
   at least one first electrode (E1) securely fastened to the second part (F),
   a first support (2e), securely fastened to the second part (R1), comprising at least one second electrode (E3) situated facing the first electrode (E1) when no torque (C) is applied to the shaft (2a), the first and the second electrodes (E1, E3) generating a first capacitance (C1), the value of which varies according to a movement (Δd) of the second part (F),
   means (M1) for measuring the first capacitance (C1),
   means (M2) for converting the first capacitance (C1) into a value of the torque (C) applied to the shaft (2a),
   wherein the transmission means (2b) has a shape of a cylinder surrounding the rotary shaft (2a), the second part (F) is a part of the cylinder contained between two grooves (D1, D2) in a longitudinal axis (X-X') of the cylinder, starting from a transverse face of the cylinder, termed free end (T1), and extending as far as a linked end (T2), situated opposite said free end (T1).

2. The device (D) for measuring torque as claimed in claim 1, wherein the means (M1) for measuring the first capacitance (C1) comprise:
   a resonant coil (B1) connected to the second electrode (E3), forming, with the second electrode (E3), a passive resonant circuit having a resonant frequency (f0 dependent on the first capacitance (C1),
   a second support (2f), situated facing the first support (2e) and remote from said first support (2e), comprising an exciter coil (B2) able to generate an electromagnetic field intended for the resonant coil (B1) and able to receive an induced magnetic field originating from the resonant coil (B1),
   means (E) for emitting an electromagnetic field,
   means (R) for receiving an electromagnetic field, the resonant frequency ($F_R$) of which depends on the torque (C) applied to the shaft,
   switching means (MUX) that are linked electrically on one side to the exciter coil (B2) and on the other side either to the emission means (E) or to the reception means (R).

3. The measuring device as claimed in either claim 2, wherein the conversion means (M2) comprise a microcontroller (μ) linked electrically on one side to the reception means (R) and to the emission means (E).

4. The measuring device as claimed in claim 2, wherein the two grooves (D1, D2) each comprise, at their linked ends (T2), a recess (Z) of rounded shape.

5. The measuring device as claimed in claim 2, wherein, the transmission means (2b) being a cylinder having an outer diameter ($D_{ext}$) and an inner diameter ($D_{int}$):
   the first electrode (E1) is situated on a transverse face of the cylinder,
   the first support (2e) has the shape of a flat ring, with an outer diameter equal to the outer diameter ($D_{ext}$) of the cylinder and with an inner diameter equal to the inner diameter ($D_{int}$) of the cylinder.

6. An electric bicycle (V), comprising a measuring device (D) as claimed in claim 2.

7. The measuring device as claimed in either claim 1, wherein the conversion means (M2) comprise a microcontroller (μ) linked electrically on one side to the reception means (R) and to the emission means (E).

8. The measuring device as claimed in claim 7, wherein the two grooves (D1, D2) each comprise, at their linked ends (T2), a recess (Z) of rounded shape.

9. The measuring device as claimed in claim 7, wherein, the transmission means (2b) being a cylinder having an outer diameter ($D_{ext}$) and an inner diameter ($D_{int}$):
   the first electrode (E1) is situated on a transverse face of the cylinder,
   the first support (2e) has the shape of a flat ring, with an outer diameter equal to the outer diameter ($D_{ext}$) of the cylinder and with an inner diameter equal to the inner diameter ($D_{int}$) of the cylinder.

10. An electric bicycle (V), comprising a measuring device (D) as claimed in claim 7.

11. The measuring device as claimed in claim 1, wherein the two grooves (D1, D2) each comprise, at their linked ends (T2), a recess (Z) of rounded shape.

12. The measuring device as claimed in claim 11, wherein the grooves have a length (L1) of between 30% and 70% of a length (L) of the transmission means (2b).

13. The measuring device as claimed in claim 12, wherein the first support (2e) comprises a printed circuit board with two faces (A1, A2),
the first face (A1) comprises the first electrode (E1),
the second face (A2) comprises the resonant coil (B1) that is linked electrically on one side to the first electrode (E1) by a via ($V_{x1}$) and linked electrically on the other side to ground.

14. The measuring device as claimed in claim 13, wherein, the transmission means (2b) being a cylinder having an outer diameter ($D_{ext}$) and an inner diameter ($D_{int}$):
the first electrode (E1) is situated on a transverse face of the cylinder,
the first support (2e) has the shape of a flat ring, with an outer diameter equal to the outer diameter ($D_{ext}$) of the cylinder and with an inner diameter equal to the inner diameter ($D_{int}$) of the cylinder.

15. The measuring device as claimed in claim 11, wherein, the transmission means (2b) being a cylinder having an outer diameter ($D_{ext}$) and an inner diameter ($D_{int}$):
the first electrode (E1) is situated on a transverse face of the cylinder,
the first support (2e) has the shape of a flat ring, with an outer diameter equal to the outer diameter ($D_{ext}$) of the cylinder and with an inner diameter equal to the inner diameter ($D_{int}$) of the cylinder.

16. An electric bicycle (V), comprising a measuring device (D) as claimed in claim 11.

17. The measuring device as claimed in claim 12, wherein, the transmission means (2b) being a cylinder having an outer diameter ($D_{ext}$) and an inner diameter ($D_{int}$):
the first electrode (E1) is situated on a transverse face of the cylinder,
the first support (2e) has the shape of a flat ring, with an outer diameter equal to the outer diameter ($D_{ext}$) of the cylinder and with an inner diameter equal to the inner diameter ($D_{int}$) of the cylinder.

18. The measuring device as claimed in claim 1, wherein, the transmission means (2b) being a cylinder having an outer diameter ($D_{ext}$) and an inner diameter ($D_{int}$):
the first electrode (E1) is situated on a transverse face of the cylinder,
the first support (2e) has the shape of a flat ring, with an outer diameter equal to the outer diameter ($D_{ext}$) of the cylinder and with an inner diameter equal to the inner diameter ($D_{int}$) of the cylinder.

19. An electric bicycle (V), comprising a measuring device (D) as claimed in claim 1.

20. A method for measuring a torque applied to a rotary shaft (2a), comprising:
Step 1: mounting, on the rotary shaft (2a), torque transmission means (2b) having a shape of a cylinder surrounding the rotary shaft (2a), including a first part (R1) securely fastened to the shaft and receiving the torque (C) applied to said shaft (2a), and a second part (F) securely fastened to the first part (R1), the second part (F) being a part of the cylinder contained between two grooves (D1, D2) in a longitudinal axis (X-X') of the cylinder, starting from a transverse face of the cylinder, termed free end (T1), and extending as far as a linked end (T2), situated opposite said free end (T1), and said second part (F) being able to move in relation to the first part (R1) when a torque (C) is applied to the first part (R1),
Step 2: attaching a first electrode securely to the first part (F),
Step 3: mounting a first support (2e), securely fastened to the second part (R1), comprising at least one second electrode (E3) situated facing the first electrode (E1) when no torque (C) is applied to the shaft (2a), the first and the second electrodes (E1, E3) generating a first capacitance (C1), the value of which varies according to a movement (Δd) of the second part (F),
Step 4: measuring the first capacitance (C1'), when a torque (C) is applied to the shaft, using measuring means (M1),
Step 5: calculating the torque (C) applied to the shaft (2a) depending on the first capacitance (C1), using conversion means (M2).

\* \* \* \* \*